United States Patent
Nock et al.

(10) Patent No.: US 6,893,093 B2
(45) Date of Patent: May 17, 2005

(54) LOCKING DEVICE FOR A VEHICLE SEAT

(75) Inventors: Eckhard Nock, Güntersdorf (DE); Richard Hänsel, Flonheim (DE); Mario Klein, Blumberg (DE); Martin Kraus, Katzenbach (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/890,951

(22) Filed: Jul. 14, 2004

(65) Prior Publication Data

US 2004/0245816 A1 Dec. 9, 2004

Related U.S. Application Data

(63) Continuation of application No. PCT/EP03/07836, filed on Jul. 18, 2003.

(30) Foreign Application Priority Data

Aug. 1, 2002 (DE) .......................................... 102 35 141

(51) Int. Cl.⁷ ................................................. B60N 2/22
(52) U.S. Cl. .................................. 297/367; 297/216.13
(58) Field of Search ........................... 297/367, 216.13, 297/318.12

(56) References Cited

U.S. PATENT DOCUMENTS

| | | | |
|---|---|---|---|
| 5,154,476 A | * 10/1992 | Haider et al. | ................ 297/367 |
| 5,540,117 A | 7/1996 | Hänsel et al. | |
| 6,139,105 A | * 10/2000 | Morgos et al. | ........ 297/378.12 |
| 6,209,955 B1 | * 4/2001 | Seibold | .................. 297/216.13 |
| 6,540,232 B2 | 4/2003 | Hänsel et al. | |
| 6,722,739 B2 | * 4/2004 | Klein et al. | .................. 297/367 |
| 2002/0008419 A1 | 1/2002 | Boltze et al. | |
| 2002/0170381 A1 | 11/2002 | Hansel et al. | |
| 2003/0160490 A1 | 8/2003 | Nock | |

FOREIGN PATENT DOCUMENTS

| | | |
|---|---|---|
| EP | 1 260 404 A1 | 11/2002 |
| EP | 1 279 552 A2 | 1/2003 |
| WO | WO 01/76907 A1 | 10/2001 |
| WO | WO 03/010025 A1 | 2/2003 |

* cited by examiner

*Primary Examiner*—Peter R. Brown
(74) *Attorney, Agent, or Firm*—Womble Carlyle Sandridge & Rice, PLLC

(57) ABSTRACT

In the case of a locking device (11) for a vehicle seat, in particular for a motor vehicle seat, having a pivotably mounted locking element (15), a counterpart element (18) which interacts with the locking element (15), a pivotably mounted, spring-loaded clamping eccentric (21) which acts on the locking element (15) and keeps the latter in engagement with the counterpart element (18) in a normal situation, and an intercepting component (25) which is coupled to the clamping eccentric (21) and supports the locking element (15) in a crash situation, a stop (35) which is assigned to the locking element (15) is provided for interaction with the clamping eccentric (21) in a crash situation.

22 Claims, 2 Drawing Sheets

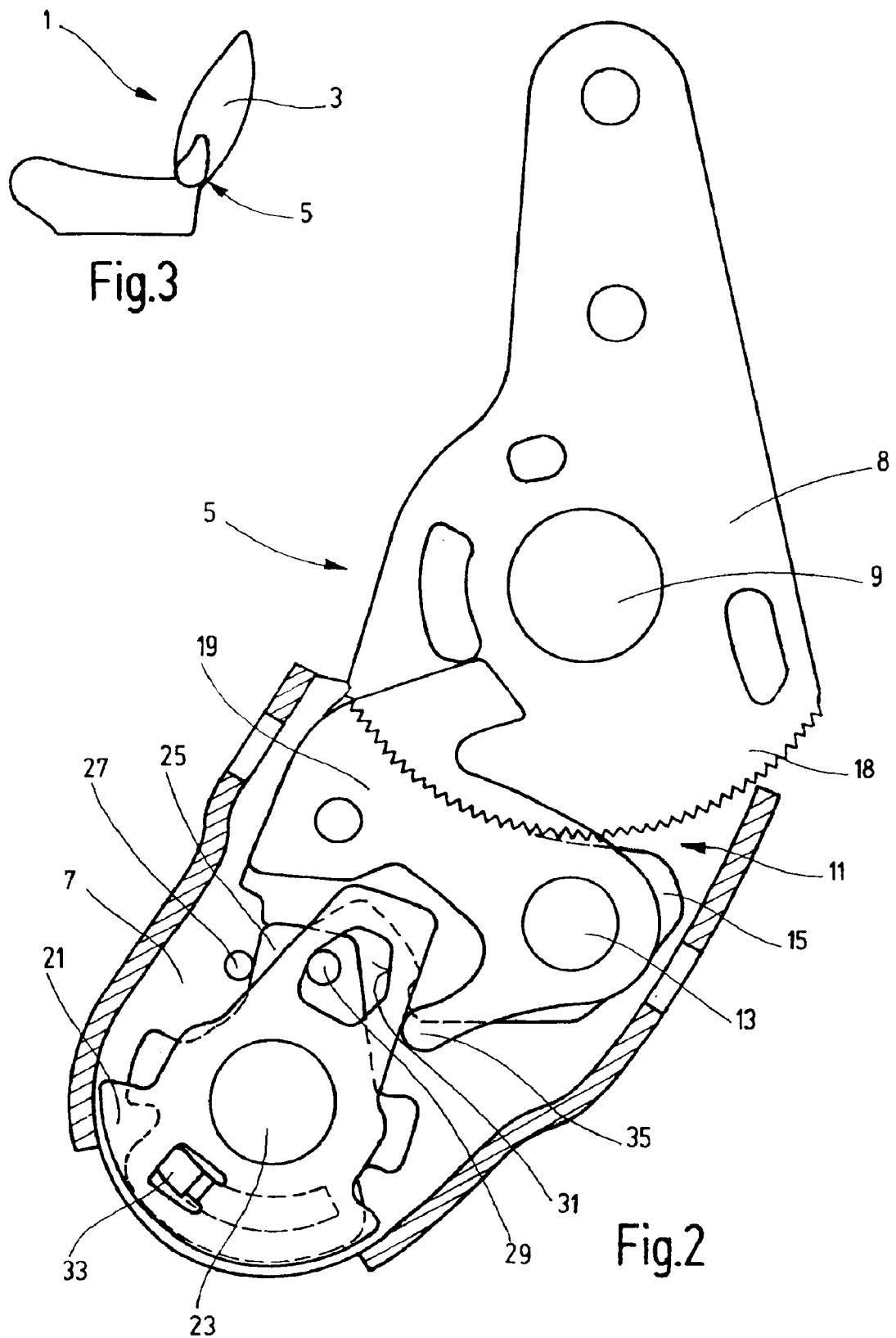

US 6,893,093 B2

LOCKING DEVICE FOR A VEHICLE SEAT

CROSS-REFERENCE TO RELATED APPLICATION

This is a continuation of PCT/EP03/07836, which was filed Jul. 18, 2003, designates the U.S., and is incorporated herein by reference.

BACKGROUND OF THE INVENTION

The present invention relates to a locking device for a vehicle seat, in particular for a motor vehicle seat, having a pivotably mounted locking element, a counterpart element which interacts with the locking element, a pivotably mounted, spring-loaded clamping eccentric which acts on the locking element and keeps the locking element in engagement with the counterpart element in a normal situation, and an intercepting component which is coupled to the clamping eccentric and supports the locking element in a crash situation.

A known locking device, which is of the type described in the immediately preceding paragraph, locks a fitting for setting the inclination of the backrest. In a normal situation, the intercepting component is arranged in the opening direction of the locking element and at a distance therefrom while the locking element bears against the other/counterpart locking element in the radial direction thereof. During the release process, and after the intercepting component pivots along a portion of its path of travel, the intercepting component carries along the clamping eccentric as a result of the intercepting component and the clamping eccentric being coupled together. In a crash situation, the intercepting component supports the locking element (i.e. detent pawl) while the clamping eccentric can move out of the way. In the event of a coupling via a slot and pin guide, the clamping eccentric could have an effect on the intercepting component.

BRIEF SUMMARY OF SOME ASPECTS OF THE INVENTION

The present invention is based on the object of improving a locking device of the type mentioned in the two immediately preceding paragraphs. In accordance with one aspect of the present invention, this object is achieved by the provision of a locking device for a vehicle seat, in particular for a motor vehicle seat, having a pivotably mounted locking element, a counterpart element which interacts with the locking element, a pivotably mounted, spring-loaded clamping eccentric which acts on the locking element and keeps the locking element in engagement with the counterpart element in a normal situation, and an intercepting component which is coupled to the clamping eccentric and supports the locking element in a crash situation, characterized in that a stop which is assigned to the locking element is provided for interaction with the clamping eccentric in a crash situation.

Because a stop, which is assigned to the locking element, is provided for interaction with the clamping eccentric in a crash situation, a yielding movement of the clamping eccentric in a crash situation can be stopped. A reaction on the intercepting component, which could occur at high load peaks, in which case the intercepting component could leave its desired position by moving, can be ruled out. The locking device according to the invention can therefore also be used in the case of very high, pulsed loads. For example, the locking device can be used in a fitting designed as a means of setting the inclination of the backrest or in a locking device for connecting the vehicle seat to the vehicle structure. The coupling between the intercepting component and the clamping eccentric via a slot and pin guide or similar travel-delaying means has the advantage of enabling structural space to be saved.

The stop is preferably provided on a control cam with which the clamping eccentric interacts and which is connected to the locking element, because then components of different thickness, in accordance with their function, can be arranged in different planes saving on structural space. For more simple production, the stop is preferably integrally formed on the control cam, so that it can be punched simultaneously with the latter out of a metal sheet with a neutral effect on cost.

In order to avoid any pulse transmission to the intercepting component before the locking element bears against the intercepting component, in a normal situation the intercepting component bears against a fixed stop which is preferably fixed on a component which is connected to the diverse bearings for the pivotable components of the locking device. For example, the stop can be fixed on a fitting part.

BRIEF DESCRIPTION OF THE DRAWINGS

The present invention is explained in greater detail below with reference to an exemplary embodiment which is illustrated in the drawings, in which:

FIG. 2 shows a view corresponding to FIG. 1 after a high pulse, and FIG. 3 shows a schematic illustration of a vehicle seat.

DETAILED DESCRIPTION OF THE INVENTION

Figure 1:
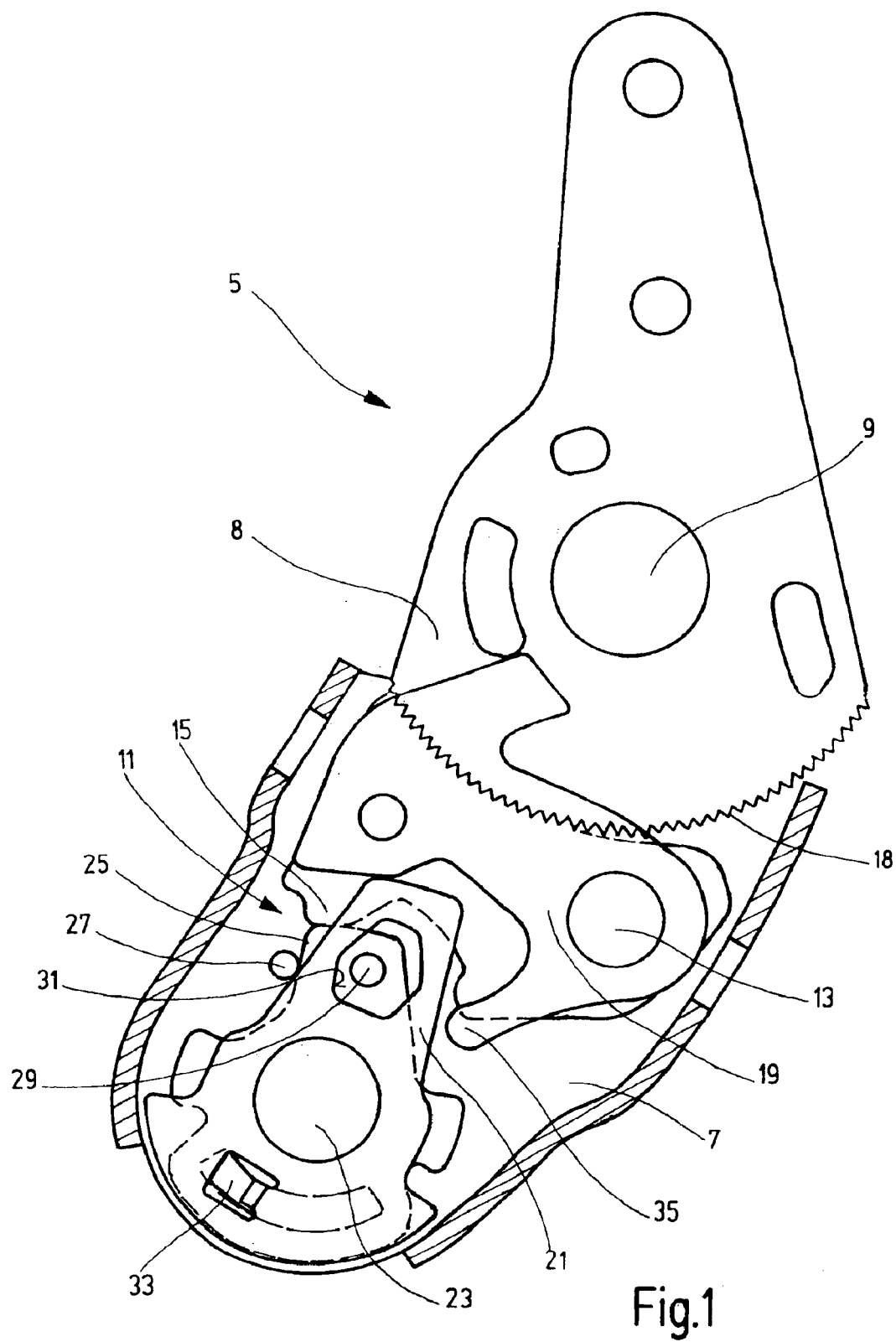
FIG. 1 shows a view of the exemplary embodiment in a locked state in a normal situation.

A vehicle seat 1 of a motor vehicle is provided with a fitting 5 on both sides for setting the inclination of its backrest 3. The fitting 5 has a fitting lower part 7, which is fixed on the seat-part structure, and a fitting upper part 8, which is fixed on the backrest structure. The fitting upper part 8 is mounted on a backrest bearing bolt 9 for pivoting relative to the fitting lower part 7. The fitting lower part 7 comprises two plate-like, parallel housing parts. The plate-like, parallel housing parts of the fitting lower part 7 define a structural space therebetween. The structural space, which is defined between the parallel housing parts of the fitting lower part 7, is for accommodating a locking device 11, which is described more specifically below.

A detent pawl 15 is pivotably mounted on a pawl bearing bolt 13 of the fitting lower part 7, and the detent pawl 15 functions as locking element. For locking purposes, the detent pawl 15 has teeth which interact with a toothed rim 18 which is integrally formed on the fitting upper part 8. The toothed rim 18 is a counterpart element with respect to the detent pawl 15. A control cam 19 is mounted on the pawl bearing bolt 13 and is connected in a rotationally fixed manner to the detent pawl 15. The control cam 19 controls the engagement of the detent pawl 15 in the toothed rim 18. The control cam 19 also interacts with control elements of the fitting upper part 8. Some of the teeth of the detent pawl 15 and the toothed-rim 18 should be hidden from view behind the control cam 19 in FIGS. 1 and 2; nonetheless, those hidden teeth are shown in solid lines in FIGS. 1 and 2 for purposes of illustration.

In order to secure the locked state of the described elements of the locking device 11, various securing elements are provided. A clamping eccentric 21 is mounted pivotably on an eccentric bearing bolt 23. The clamping eccentric 21 is loaded in the closing direction by means of a spring (not shown). The clamping eccentric 21, which is provided with a clamping surface curved eccentrically with respect to the eccentric bearing bolt 23, acts on the control cam 19 which pushes the detent pawl 15 into the toothed rim 18. An intercepting component 25 is mounted pivotably on the eccentric bearing bolt 23 in the plane of the detent pawl 15 and is pushed in a spring-loaded manner against a stop bolt 27. The stop bolt 27 is fixedly connected to the fitting lower part 7.

In the described, locked state of the locking device 11, the intercepting component 25 is arranged at a small distance from the side of the detent pawl 15 which faces away from the toothed rim 18, in a normal situation. This distance is smaller than the tooth height of the teeth of the detent pawl 15 and of the toothed rim 18. In a crash situation, the intercepting component 25 supports the detent pawl 15 which is loaded with a force which seeks to cause an opening moment. As a result, the intercepting component 25 prevents the detent pawl 15 from opening.

In order to release the locking device 11, the intercepting component 25 is provided with a release bolt 29. The release bolt 29 protrudes outward, on one side, through a slotted guide of the fitting lower part 7, and on the other side the release bolt 29 reaches through an aperture 31 in the clamping eccentric 21. In addition to this coupling via the release bolt 29 and the aperture 31, the clamping eccentric 21 and the intercepting component 25 are coupled to each other via a slot and pin guide 33. During the release process, the intercepting component 25 is first of all pivoted away from the detent pawl 15 via the release bolt 29, in which case, after the release bolt 29 has reached the edge of the aperture 31, the clamping eccentric 21 is carried along with a travel delay and the clamping eccentric 21 releases the control cam 19 and therefore the detent pawl 15.

In a crash situation, the clamping eccentric 21 may be subjected to a pulse-like force via the backrest 3, the fitting upper part 8, the detent pawl 15 and the control cam 19. Because the clamping eccentric 21 bears against the control cam 19 without self-locking, the clamping eccentric 21 is sharply accelerated in the opening direction by the pulse-like force. In order to prevent the clamping eccentric 21 from transmitting the pulse-like force via its coupling to the intercepting component 25, in particular before the intercepting component 25 supports the detent pawl 15, a stop 35 is provided on the control cam 19. The stop 35 is designed in the form of a finger and is integrally formed on the control cam 19, on the side facing away from the fitting upper part 8, in the region of the pawl bearing bolt 13. The clamping eccentric 21 comes to bear against the stop 35 before the edge of the aperture 31 touches the release bolt 29. The intercepting component 25 therefore remains at rest and can support the detent pawl 15.

That which is claimed:

1. A locking device that is for a vehicle seat and operates advantageously in a crash situation, the locking device comprising:
    a locking element mounted for pivoting into and out of locking engagement with a counterpart element;
    a pivotably mounted, spring-loaded clamping eccentric for acting on the locking element and thereby keeping the locking element in locking engagement with the counterpart element in a normal situation;
    a moveable intercepting component for, in a crash situation, supporting the locking element in a manner which keeps the locking element in locking engagement with the counterpart element;
    a coupling between the intercepting component and the clamping eccentric for causing at least some simultaneous movement of the intercepting component and the clamping eccentric; and
    a stop mounted for moving with the locking element, wherein the stop is operative, in the crash situation, for interacting with the clamping eccentric to restrict movement of the clamping eccentric.

2. The locking device as claimed in claim 1, wherein the stop is operative, in the crash situation, so that the clamping eccentric comes to bear against the stop before the coupling causes simultaneous movement of the intercepting component and the clamping eccentric.

3. The locking device as claimed in claim 2, wherein the coupling between the intercepting component and the clamping eccentric is for causing the intercepting component to carry along the clamping eccentric with a travel delay.

4. The locking device as claimed in claim 2, wherein the clamping eccentric's acting on the locking element is via a control cam which is connected in a rotationally fixed manner to the locking element.

5. The locking device as claimed in claim 4, wherein the stop is formed on the control cam.

6. The locking device as claimed in claim 4, wherein the stop is integrally formed on the control cam and is finger-like.

7. The locking device as claimed in claim 2, wherein the locking element, the clamping eccentric and the intercepting component are mounted on a common component.

8. The locking device as claimed in claim 7, wherein the common component has a fixed stop that abuts the intercepting component in the normal situation.

9. The locking device as claimed in claim 1, wherein the coupling between the intercepting component and the clamping eccentric is for causing the intercepting component to carry along the clamping eccentric with a travel delay.

10. The locking device as claimed in claim 9, wherein the clamping eccentric's acting on the locking element is via a control cam which is connected in a rotationally fixed manner to the locking element, and the stop is formed on the control cam.

11. The locking device as claimed in claim 9, wherein the locking element, the clamping eccentric and the intercepting component are mounted on a common component, and the common component has a fixed stop against which the intercepting component abuts in the normal situation.

12. The locking device as claimed in claim 1, wherein the clamping eccentric's acting on the locking element is via a control cam which is connected in a rotationally fixed manner to the locking element.

13. The locking device as claimed in claim 12, wherein the stop is formed on the control cam.

14. The locking device as claimed in claim 12, wherein the stop is integrally formed on the control cam and is finger-like.

15. The locking device as claimed in claim 12, wherein the locking element, the clamping eccentric and the intercepting component are mounted on a common component, and the common component has a fixed stop against which the intercepting component abuts in the normal situation.

16. The locking device as claimed in claim 12, wherein the clamping eccentric engages a surface of the control cam to provide the clamping eccentric's acting on the locking element and thereby the keeping of the locking element in the locking engagement with the counterpart element in the normal situation, and wherein said surface of the control cam is discontiguous with and distant from the stop.

17. The locking device as claimed in claim 1, wherein the locking element, the clamping eccentric and the intercepting component are mounted on a common component.

18. The locking device as claimed in claim 17, wherein the common component has a fixed stop that abuts the intercepting component in the normal situation.

19. The locking device as claimed in claim 1, wherein the locking device is in combination with a fitting, and the fitting is:

an adjuster for adjusting the inclination of a component of the vehicle seat, or an adjuster for connecting the vehicle seat to a vehicle structure.

20. The combination as claimed in claim 19, wherein the combination is further in combination with the vehicle seat.

21. The locking device as claimed in claim 1, wherein the locking element, the clamping eccentric and the intercepting component are mounted on a common component, and the common component has a fixed stop against which the intercepting component abuts in the normal situation.

22. The locking device as claimed in claim 1, wherein the intercepting component is mounted for both pivoting relative to and with the clamping eccentric.

* * * * *